Aug. 2, 1927.

V. J. KOSIANCIC 1,637,616

HAND FEED FOR DRAG SAW MACHINES

Filed Nov. 11, 1924

INVENTOR
VALENTINE JOHN KOSIANCIC
BY Harold C. Shipman
ATTORNEY

Patented Aug. 2, 1927.

1,637,616

UNITED STATES PATENT OFFICE.

VALENTINE JOHN KOSIANCIC, OF CRESCENT VALLEY, BRITISH COLUMBIA, CANADA.

HAND FEED FOR DRAG-SAW MACHINES.

Application filed November 11, 1924. Serial No. 749,165.

My present invention appertains generally to improvements in the art of feeding mechanism for drag saws and specifically to hand feeding device of this character, as described in the present specification and illustrated in the accompanying drawings.

The object of my invention is to provide a simple and durable hand feed for drag saw machines by which logs will be advanced or retarded without slipping.

A further object of my invention is to provide a feeding device of this character which need not be released from the log carrying drum shaft during advancement or retrogression of a log.

With the foregoing and other objects in view which will appear more fully as the description proceeds, the invention resides in the novel combination and arrangement of co-operating elements as hereinafter more specifically set forth, claimed and shown in the accompanying drawings forming a part of the present application, and in which:

Figure 1:
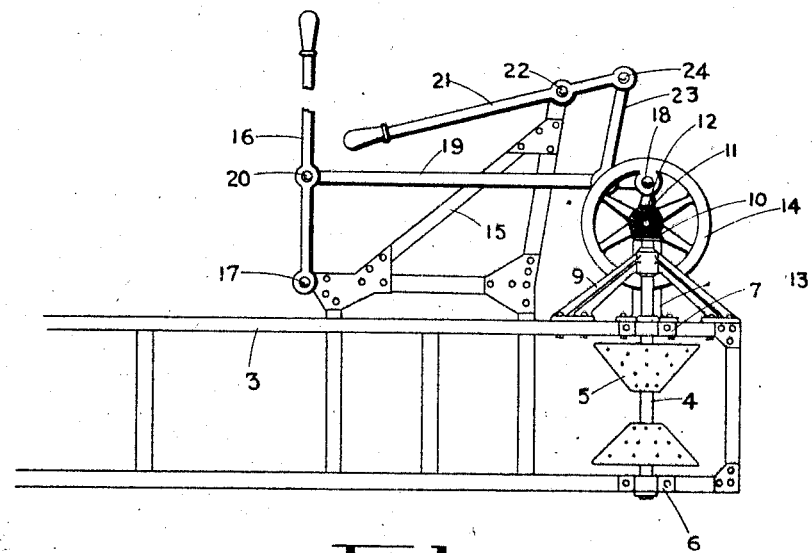
Fig. 1 is a plan view of my invention.

My present invention is adapted for use on log feeding runways of different types, one form of which I have disclosed and generally indicated by the numeral 3. A drum shaft 4 extends transversely of the runway and carries a pair of frusto-conical drums 5. The shaft 4 journaled is in bearings 6 and 7.

The outer end of the shaft 4 is supported by a bracket 9. A pinion 10 is mounted on the outer end of said shaft and meshes with and drives a pinion 11 mounted upon the vertical shaft 12 which is supported by the bracket 13. 14 designates a crank wheel mounted upon the vertical shaft 12.

The lever mechanism for rotating the wheel 14 is mounted on the brace structure 15 and includes a lever 16 pivoted as at 17 thereto. This lever 16 is connected to the crank wheel 14 as at 18 through the medium of the connecting rod 19 which is also connected to said lever as at 20. 21 designates an auxiliary lever which is pivoted to the brace structure 15 and is connected by the link 23 to the connecting rod 19. This link 23 is connected as at 24 to the end of lever 21 and as at 25 to the connecting rod 19.

Figure 2:
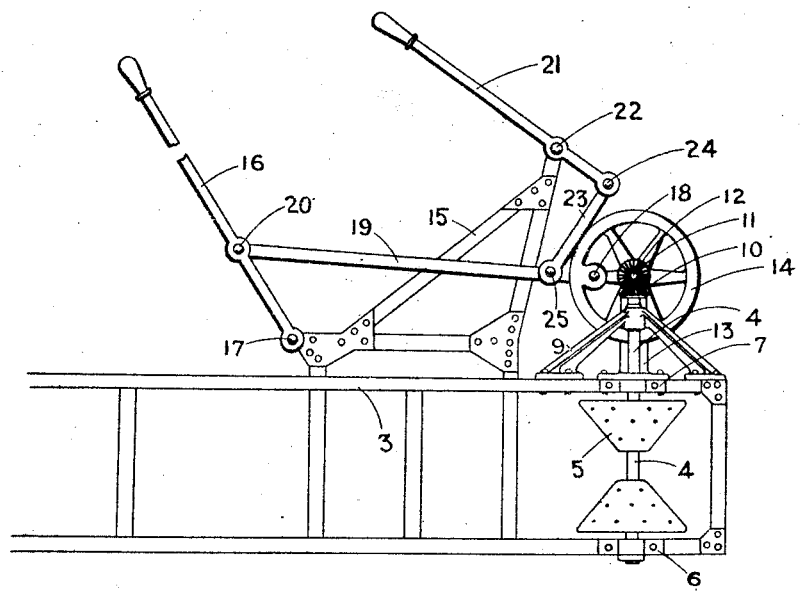
Fig. 2 is a similar view illustrating the components in another position.

In operation, the lever 16 is oscillated back and forth for the purpose of reciprocating the connecting rod 19 and rotating the crank wheel 14. The lever 21 is also oscillated at intervals to carry the connecting rod 19 over dead centre and thereby facilitating actuation of and preventing stopping of the lever 16 when the connecting rod 19 is on dead centre with respect to the pivotal connection 18 and shaft 12, as clearly shown in Fig. 2.

While the preferred embodiment of the invention has been described it is to be understood that minor changes in the details of construction, combination and arrangement of co-operating elements may be resorted to within the scope of what is claimed without departing from the spirit of the invention.

What I claim as new is:

In a hand feeding device for drag saw machines; the combination with a runway and revolving log carrying drums mounted on a shaft suitably journalled in said runway; of a pinion carried at the outer end of said shaft; a second shaft suitably supported from one side of said runway and at right angle to first said shaft; a pinion mounted on said second shaft, adapted to mesh with and drive first said pinion; a crank wheel mounted on said vertical shaft; a lever frame suitably supported from said runway; a drive lever pivotally mounted at one end to said frame; a drive link between said drive lever and said crank wheel; an auxiliary lever fulcrumed on said frame and a connecting link between said drive link and the end of last said lever.

In testimony whereof, I affix my signature.

VALENTINE JOHN KOSIANCIC.